(12) United States Patent  
Mason

(10) Patent No.: US 9,305,396 B2  
(45) Date of Patent: Apr. 5, 2016

(54) IDENTIFYING FEATURES IN POLYGONAL MESHES

(71) Applicant: Electronic Arts Inc., Redwood City, CA (US)

(72) Inventor: Ashton Mason, Twickenham (GB)

(73) Assignee: Electronic Arts Inc., Redwood City, CA (US)

( * ) Notice: Subject to any disclaimer, the term of this patent is extended or adjusted under 35 U.S.C. 154(b) by 376 days.

(21) Appl. No.: 13/940,976

(22) Filed: Jul. 12, 2013

(65) Prior Publication Data

US 2015/0015577 A1    Jan. 15, 2015

(51) Int. Cl.
*G06T 15/00* (2011.01)
*G06T 17/10* (2006.01)
*G06T 15/50* (2011.01)

(52) U.S. Cl.
CPC ............... *G06T 17/10* (2013.01); *G06T 15/50* (2013.01)

(58) Field of Classification Search
CPC .................................. G06T 17/10; G06T 15/50
USPC .......................................... 345/423, 419, 441
See application file for complete search history.

(56) References Cited

U.S. PATENT DOCUMENTS

| | | | |
|---|---|---|---|
| 6,587,104 B1 * | 7/2003 | Hoppe | G06T 17/20 345/423 |
| 7,362,326 B2 * | 4/2008 | Su | G06T 11/203 345/419 |
| 8,358,819 B2 * | 1/2013 | Wu | G06K 9/4638 382/128 |
| 8,405,659 B2 * | 3/2013 | Lakshmanan | G09K 9/00214 345/419 |

* cited by examiner

*Primary Examiner* — Phu K Nguyen
(74) *Attorney, Agent, or Firm* — Lowenstein Sandler LLP

(57) ABSTRACT

A polygonal mesh is received and the edges and vertices of the polygonal mesh are analyzed. A positive (e.g., convex or protruding) feature may be identified where the positive feature is bound by a non-concave edge (e.g., a convex edge or a planar edge). A negative (e.g., concave or receding) feature may also be identified where the negative feature is bound by a non-convex edge (e.g., a concave edge or a planar edge).

24 Claims, 11 Drawing Sheets

IDENTIFYING FEATURES IN POLYGONAL MESHES

TECHNICAL FIELD

This disclosure relates to the field of polygonal meshes and, in particular, to identifying features of polygonal meshes.

BACKGROUND

A polygonal mesh may be a collection of vertices, edges, and faces that define the shape and/or boundary of an object. A vertex may be a position (e.g., a point or location). An edge may be a connection between two vertices (e.g., may be a line connecting two vertices). A face may a closed set of edges. For example, a triangular face may be formed with a closed set of three edges, a quadrilateral face may be formed with a closed set of four edges, etc. The faces may consist of various polygonal shapes such as triangles, quadrilaterals, convex polygons, concave polygons, regular polygons (e.g., polygons which may have equal length sides and may have equal angles) and/or irregular polygons (e.g., polygons which may not have equal length sides and may not have equal angles).

Polygonal meshes are used in or applied in various areas. For example, computer-aided manufacturing (CAM) processes may use polygonal meshes to define components or parts that are to be manufactured. In another example, polygonal meshes may be used in computer animation to create more lifelike movies or images. In a further example, game applications (e.g., video games, computer games) often use polygonal meshes to represent objects in a virtual environment.

BRIEF DESCRIPTION OF THE DRAWINGS

The present disclosure will be understood more fully from the detailed description given below and from the accompanying drawings of various embodiments of the present disclosure, which, however, should not be taken to limit the present disclosure to the specific embodiments, but are for explanation and understanding only.

DETAILED DESCRIPTION

Systems and methods in accordance with various embodiments of the present disclosure provide the ability to identify features in polygonal meshes (e.g., a computer representation of an object). In one embodiment, negative features and positive features may be identified by analyzing the edges and vertices of polygonal meshes to identify bounding edges for the negative features and positive features. Each edge of a polygonal mesh may be classified as one of a convex edge, a concave edge, or a planar edge. The vertices in the polygonal mesh may be classified as a convex hyperbolic vertex, a concave hyperbolic vertex, or non-hyperbolic based on the kinds of edges to which they are incident. Each edge is further classified as a simple edge or a complex edge. The edges are further classified as bounding, potentially bounding, or non-bounding. The potentially bounding edges may further be analyzed to determine whether any of the potentially bounding edges should be reclassified as non-bounding edges. The bounding edges and the remaining potentially bounding edges may be added to a set of bounding edges for the positive or negative feature.

Figure 1:
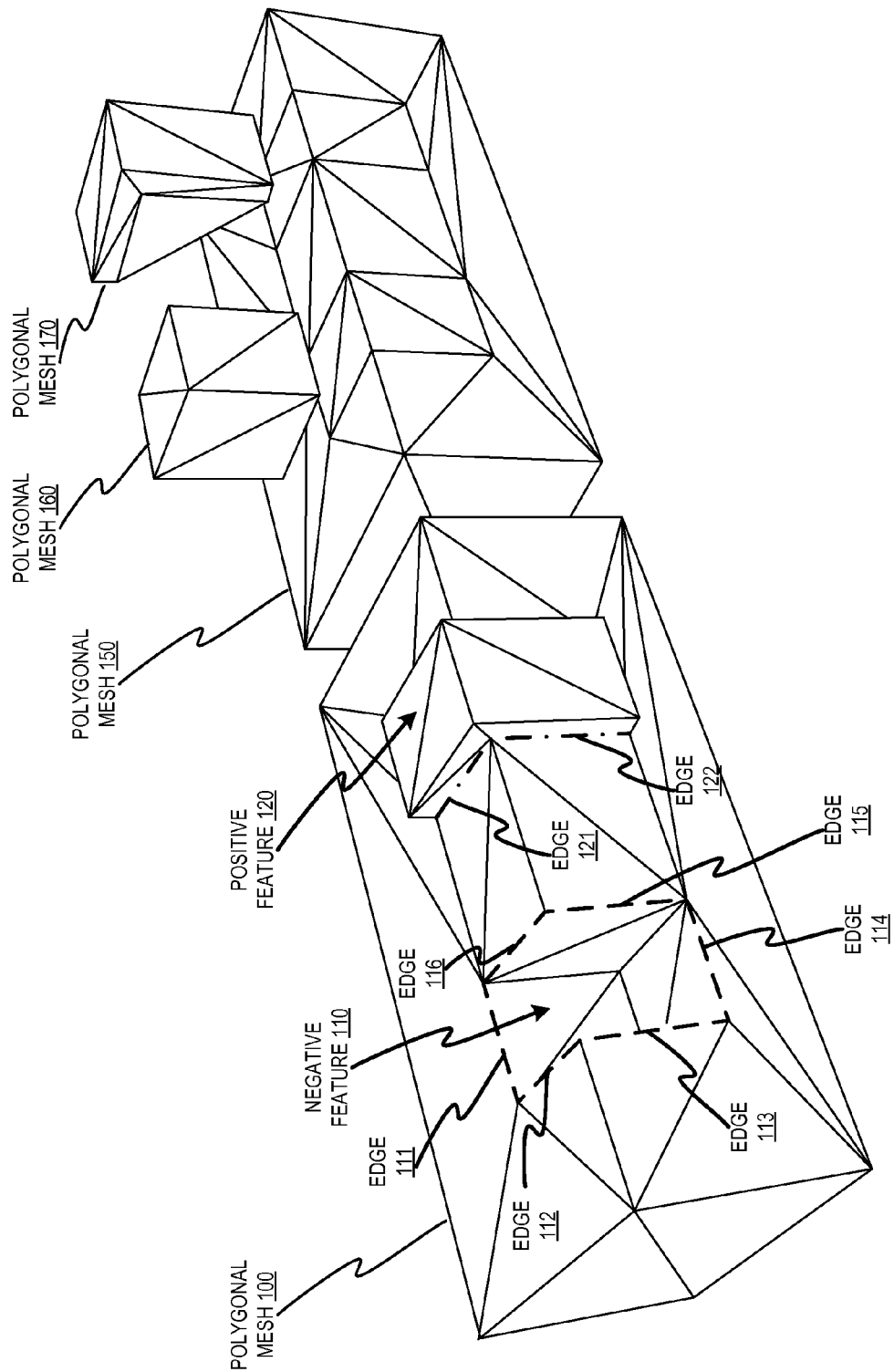
FIG. 1 is a diagram illustrating a perspective view of polygonal meshes, according to one embodiment.

FIG. 1 is a diagram illustrating a perspective view of polygonal meshes 100, 150, 160, and 170, according to one embodiment. As discussed above, a polygonal mesh may be a collection of vertices (e.g., positions, points or locations), edges (a line or a connection between two vertices), and faces (e.g., a closed set of edges) that define the shape and/or boundary of an object. A polygonal mesh may also be referred to as a mesh or a computer representation of an object. As illustrated in FIG. 1, each of the polygonal meshes 100, 150, 160, and 170 includes multiple vertices, edges, and faces (e.g., multiple triangular faces). For brevity, simplicity, and ease of disclosure, the polygonal meshes discussed in this disclosure may include triangular faces. It should be understood that polygonal meshes may include various polygonal faces (e.g., may include triangular faces, square faces, rectangular faces, trapezoidal faces, etc.) and the embodiments described herein may also be applied to polygonal meshes that include different types of faces (e.g., includes regular polygons or irregular polygons).

The polygonal mesh 100 includes negative feature 110. In one embodiment, a negative feature may be a set of edges, vertices, and faces that form a hole or a depression in a surrounding surface of a polygonal mesh. For example, a negative feature may be a receding feature (e.g., a feature that recedes into the surrounding surface of a polygonal mesh). In another embodiment, a negative feature may be a concave feature in the surrounding surface of the polygonal mesh. The negative feature 110 may be bound by edge 111, edge 112, edge 113, edge 114, edge 115, and edge 116 (e.g., the dashed lines illustrated in FIG. 1). In one embodiment, the edges that bound the negative feature 110 (edges 111, 112, 113, 114, 115, and 116) may be referred to as bounding edges. A negative feature may be used to define a separate polygonal mesh (e.g., polygonal mesh 160 as discussed below). The separate polygonal mesh may define a volume or a shape that may fill the negative feature of a polygonal mesh. For example, negative feature 110 has the shape of a rectangular polyhedron (e.g., a 3-dimensional rectangle). The polygonal mesh 160 is a rectangular polyhedron that may fill the hole or depression that is defined by the negative feature 110 in the polygonal mesh 100.

The polygonal mesh 100 also includes positive feature 120. In one embodiment, a positive feature may be a protrusion (e.g., a protuberance) or a protruding feature that extends away (e.g., up) from the surrounding surface of the polygonal mesh 100. In another embodiment, a positive feature may be a convex feature in the surrounding surface of the polygonal mesh. The positive feature 120 may be bound by edge 121 and edge 122 (e.g., the dotted and dashed lines illustrated in FIG.

1). The positive feature 120 is also bound by additional edges that are not visible in FIG. 1 due to the perspective view of the polygonal mesh 100. In one embodiment, the edges that bound the positive feature 120 (edges 121, 122, and the other edges not shown in FIG. 1) may also be referred to as bounding edges. A positive feature may be used to define a separate polygonal mesh (e.g., polygonal mesh 170 as discussed below). The separate polygonal mesh may define a volume or a shape formed by a positive feature when the positive feature is removed (e.g., cut away) from the polygonal mesh. For example, positive feature 120 has the shape of a portion of a rectangular polyhedron. The polygonal mesh 170 is in the shape of a portion rectangular polyhedron that may be defined when the positive feature 120 is removed from the surround surface of the polygonal mesh 100.

In one embodiment, the polygonal mesh 150 may be a polygonal mesh created after the negative feature 110 of polygonal mesh 100 and positive feature 120 of polygonal mesh 100 have been identified and removed from the polygonal mesh 100. For example, the polygonal mesh 150 may be created after the hole or depression defined by the negative feature 110 is filled in and the protrusion defined by positive feature 120 is removed.

In one embodiment, the features that may be identified (e.g., the positive features or negative features) may be similar to volumes or features created using constructive solid geometry. Constructive solid geometry may allow complex surfaces or objects (e.g., polygonal meshes) to be generated or created using Boolean operators to combine objects (e.g., other polygonal meshes). For example, referring back to FIG. 1, constructive solid geometry may be used to generate polygonal mesh 100 by performing a union of polygonal mesh 150 with polygonal mesh 170 and a subtraction of the polygonal mesh 160 from the resultant polygonal mesh. In another embodiment, the set of bounding edges for the positive or negative features may be similar to intersection loops along which two intersecting volumes or polygonal meshes cross.

Identifying positive features or negative features of a polygonal mesh may be useful in various different applications, operations, actions, or processes that use polygonal meshes. In one embodiment, identifying features (e.g., one or more positive features and negative features) in a polygonal mesh may be used in computer-aided manufacturing (CAM) processes. CAM processes often use polygonal meshes to define shapes for parts, components, pieces or portions of objects. For example, a polygonal mesh may be used to define the shape of a piston for an engine, or the shape of a grommet, etc. Identifying and extracting the positive and negative features of an object represented by a polygonal mesh may allow a manufacturer to determine the shape of tools and cutting paths that may be used to manufacture a part or component.

Another application for identifying positive or negative features may be to simplify a polygonal mesh. When a positive feature or a negative feature is removed from a polygonal mesh, the number of faces, edges, and vertices in the polygonal mesh may be reduced. This may allow the polygonal mesh to be stored using less space and may allow a computing device to render the polygonal mesh more easily and may allow a computing device to use fewer computing resources (e.g., using less processing power, less memory, etc.) when rendering the polygonal mesh.

Figure 2:
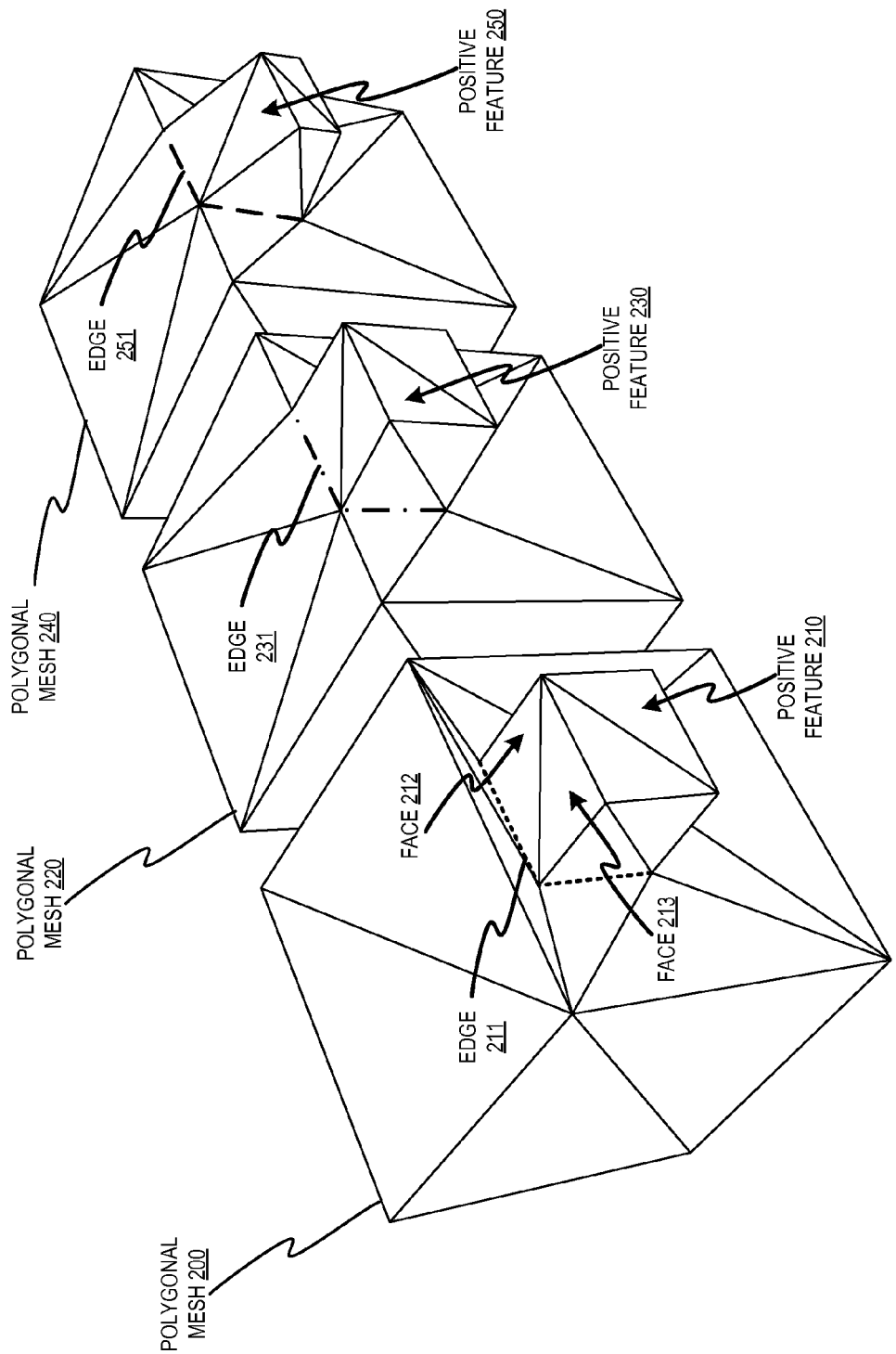
FIG. 2 is a diagram illustrating a perspective view of polygonal meshes, according to another embodiment.

FIG. 2 is a diagram illustrating a perspective view of polygonal meshes 200, 220, and 240, according to another embodiment. As illustrated in FIG. 2, each of the polygonal meshes 200, 220, and 240 includes multiple vertices, edges, and faces (e.g., multiple triangular faces). Polygonal mesh 200 includes positive feature 210 (e.g., includes a rectangular polyhedron-shaped protrusion from the front surface of the polygonal mesh 200). Polygonal mesh 220 includes positive feature 230 (e.g., includes a rectangular polyhedron-shaped protrusion from the front surface of the polygonal mesh 220). Polygonal mesh 240 includes positive feature 250 (e.g., includes a trapezoidal polyhedron-shaped protrusion from the front surface of the polygonal mesh 200).

In one embodiment, negative features and positive features may be identified by analyzing the edges and vertices of polygonal meshes to identify bounding edges for the negative features and positive features (e.g., a closed set of edges that enclose or bound a positive feature or a negative feature). The process of identifying bounding edges may also be referred to as loop detection. In one embodiment, a mesh module (as discussed below in conjunction with FIG. 7) may identify negative features and positive features of a polygonal mesh. The process of identifying the bound edges may include classifying each edge of a polygonal mesh as one of a convex edge, a concave edge, or a planar edge (as discussed below in conjunction with FIG. 3). The edges may be classified as convex, concave, or planar based on the dihedral angle of the faces incident to the edge (e.g., the angle between two planes or faces). The process of identifying the bound edges may also include classifying each vertex in the mesh as a convex hyperbolic vertex, a concave hyperbolic vertex, or non-hyperbolic based on the kinds of edges to which they are incident (as discussed below in conjunction with FIG. 3). The process of identifying the bound edges may also include further classifying each edge as a simple edge (e.g., an edge that has one hyperbolic vertex or no hyperbolic vertices) or a complex edge (e.g., an edge where both vertices are hyperbolic). The process of identifying the bound edges may also include classifying edges as bounding, potentially bounding, or non-bounding based on an analysis of the previous classifications (as discussed below in conjunction with FIG. 3). The process of identifying the bound edges may also include reclassifying potentially bounding edges that are dominated by other potentially bounding edges as non-bounding edges and identifying the remaining potentially bounding edges as bounding edges for a positive feature or a negative feature of the polygonal mesh (as discussed below in conjunction with FIGS. 4-6).

In one embodiment, after the bounding edges have been identified, the positive feature or the negative feature bound by the bounding edges may be identified. The positive feature or the negative feature may be the set of connected faces bounded by the bounding edges (e.g., the bounding loop). In one embodiment, the set of faces for the positive or negative feature may be identified using an advancing frontier (e.g., "flood fill") algorithm that identifies faces incrementally. For example, once the bounding edges of the positive feature 210 have been identified, the set of faces for the positive feature 210 may be identified by selecting a first face that is within the bounding edges of the positive feature 210 (illustrated as dotted lines in the polygonal mesh 200). Face 212 may be selected as the first face within the bounding edges of the positive feature 210 and may be added to the set of face for the positive feature 210. Starting from face 212, a next face that is also within the bounding edges (e.g., an adjacent face that does not cross the bounding edges) is identified. For example, face 213 is adjacent to face 212 and face 213 is within the bounding edges (e.g., face 213 may be reached from face 212 without crossing the bounding edges). Face 213 may be added to the set of faces for the positive feature 210. Additional faces may be similarly identified until all of the faces for the positive feature 210 have been identified and added to the set of faces for the positive feature 210.

After a feature (e.g., a positive feature or a negative feature) is identified, the feature can be removed from the mesh by unwelding the vertices and edges at their bounding edges for the feature. The open manifold polygonal meshes that result from removing a feature may be closed using different polygonal faces, edges, and vertices. For example, triangulations may be used to tessellate open boundaries of a positive feature that has been removed (e.g., unwelded) from a polygonal mesh. The resulting closed feature mesh may represent a volume that was broken off or removed from the original polygonal mesh (as illustrated in FIG. 1).

Positive features (e.g., convex features) may be characterized intuitively as including convex edges and the bounding edges of positive features may be characterized intuitively as concave edges. For example, as illustrated in FIG. 2, bounding edge 211 of positive feature 210 is a concave edge. Similarly, negative features (e.g., concave features) may be characterized intuitively as including concave edges and the bounding edges of negative features may be characterized intuitively as convex edges. However restricting features to contain only edges that match their type (e.g., restricting positive features to contain only convex edges) and restricting the bounding edges of a feature to include only edges that oppose the type of the feature (e.g., restricting bounding edges of a negative feature to only include convex edges) may limit features to being literally convex and concave. To allow more features to be identified, the systems and methods described herein may identify features that contain planar and opposing edge types (e.g., may identify a positive or convex feature that includes a concave edge). The systems and methods described herein may also identify bounding edges that include planar edges and matching types of edges for a feature. For example, bounding edge 231 of positive feature 230 is a planar edge and bounding edge 251 of positive feature 250 is a convex edge.

Figure 3:
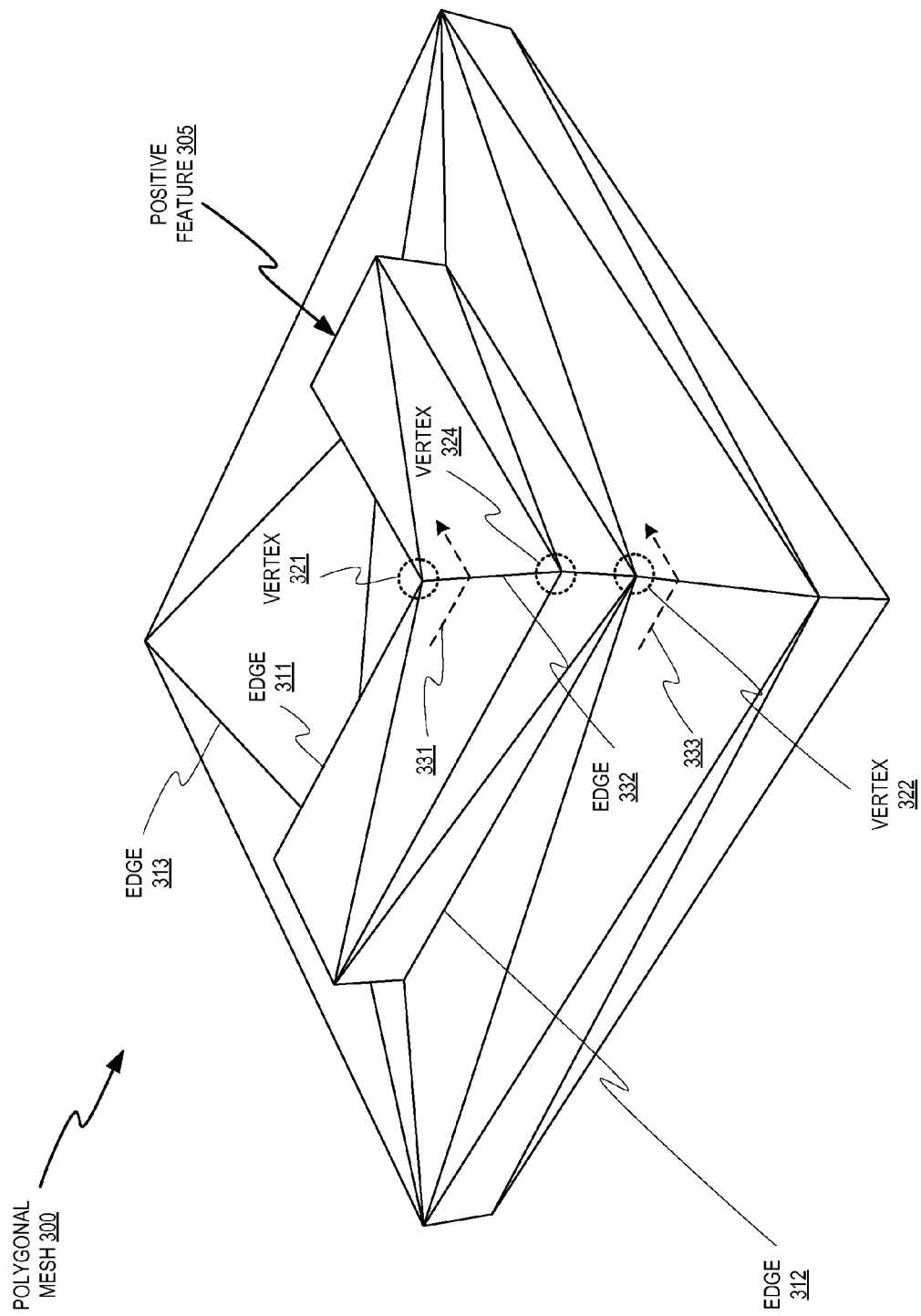
FIG. 3 is a diagram illustrating a perspective view of a polygonal mesh, according to one embodiment.

FIG. 3 is a diagram illustrating a perspective view of a polygonal mesh 300, according to one embodiment. The polygonal mesh 300 includes a positive feature 305. As discussed above, the vertices and edges of a polygonal mesh may be analyzed and classified when identifying positive features or negative features in a polygonal mesh. Each edge in the polygonal mesh 300 may be analyzed to determine whether the edge is convex, concave, or planar. In one embodiment, a convex edge is an edge that has a dihedral angle greater than a threshold (e.g., greater than 0 degrees or greater than a small positive threshold such as 3 degrees). A convex edge may also be an edge where the normals of the faces incident to the edge point away from each other. As illustrated in FIG. 3, edge 311 is an example of a convex edge. In one embodiment, a concave edge is an edge that has a dihedral angle less than a threshold (e.g., less than 0 degrees or less than a small negative threshold such as −3 degrees). A concave edge may also be an edge where the normals of the faces incident to the edge point towards each other. As illustrated in FIG. 3, edge 312 is an example of a convex edge. Edges which are not classified as convex or concave may be classified as planar edges. In one embodiment a planar edge may be an edge that has a dihedral angle of 0 degrees. A planar edge may also be an edge where the normals of the faces incident to the edge are parallel to each other. As illustrated in FIG. 3, edge 313 is an example of a planar edge.

After classifying the edges as convex, concave, or planar, each vertex of the polygonal mesh 300 may be analyzed to determine whether the vertex is convex hyperbolic, concave hyperbolic, or non-hyperbolic. In one embodiment, a hyperbolic vertex is a vertex that is incident to at least one convex edge and at least one concave edge. As illustrated in FIG. 3, vertex 321 is a hyperbolic vertex because vertex 321 is incident to convex edge 311 and a concave edge (e.g., an edge that forms the bend in the "L" shape of the positive feature 305). In another embodiment hyperbolic vertices may be saddle points where the surface curvature of the surrounding surface of the polygonal mesh 300 is convex in one direction and concave in another direction. Hyperbolic vertices may also be points where two or more sets of faces (e.g., features) meet at a fold in the polygonal mesh. A fold may be a location within a feature where faces of a feature meet to form a locally convex or a locally concave sub-feature. For example, the positive feature 305 has the shape of a raised "L" shape. The positive feature 305 includes folds (e.g., concave edges or convex edges) that form locally concave or locally convex sub-features. The vertex 321 is a hyperbolic vertex where two faces (not visible in FIG. 3) meet to form a locally-concave sub-feature of the positive feature 305 (e.g., two faces that form the bend in the "L" shape of the positive feature 305. In one embodiment, a feature (e.g., a set of edges, vertices, and faces such as positive feature 305) may include sub-features (e.g., a subset of the set of edges, vertices, and faces). In one embodiment, a vertex that is not incident to at least one convex edge and at least one concave edge may be classified as non-hyperbolic. As illustrated in FIG. 3, the vertex 324 is non-hyperbolic because the vertex 324 is incident to three convex edges and two planar edges, but is not incident to at least one concave edge.

Hyperbolic vertices may further be classified as convex hyperbolic or concave hyperbolic. In one embodiment, a convex hyperbolic vertex may be a vertex that is incident to at least two convex edges and a single concave edge. As illustrated in FIG. 3, vertex 321 is a convex hyperbolic vertex because vertex 321 is incident to two convex edges and a concave edge. In another embodiment, a concave hyperbolic vertex may be a vertex that is incident to at least two concave edges and a single convex edge. As illustrated in FIG. 3, vertex 322 is a concave hyperbolic vertex because the vertex 322 is incident to two concave edges and a convex edge. In one embodiment, a convex hyperbolic vertex may mark or indicate where a feature is folded locally to form a negative feature. For example, vertex 321 marks where a portion of positive feature 305 is folded upwards towards the top right of the polygonal mesh 300 (as indicated by the dashed arrow 331). The fold of the positive feature 305 (indicated by the dashed arrow 331) may form a negative sub-feature within the positive feature 305. In another embodiment, a concave hyperbolic vertex may mark where a feature is folded locally to form a positive feature. For example, vertex 322 marks where a portion of positive feature 305 is folded upwards towards the top right of the polygonal mesh 300 (as indicated by the dashed arrow 333). The upward fold of the positive feature 305 (indicated by the dashed arrow 333) may form a positive sub-feature within the positive feature 305. The positive and negative sub-features (which are part of a larger positive or negative feature) that meet at hyperbolic vertices may be referred to as incident features or sub-features. Hyperbolic vertices may be incident to multiple convex and multiple concave edges, where multiple incident features or sub-features meet. Thus, a single hyperbolic vertex may be classified as both convex hyperbolic and concave hyperbolic for different incident features. In one embodiment, a face may be included in one positive feature or sub-feature, and one negative positive feature or sub-feature.

In one embodiment, after classifying the vertices as hyperbolic (e.g., convex hyperbolic or concave hyperbolic or both), the edges in the polygonal mesh 300 may be analyzed to classify edges as simple or complex. A simple edge may be an edge that has only one hyperbolic vertex or has no hyperbolic vertices. As illustrated in FIG. 3, edge 332 is a simple edge because edge 332 has one hyperbolic vertex (e.g., convex hyperbolic vertex 321) and one non-hyperbolic vertex (e.g., non-hyperbolic vertex 324). A complex edge may be an edge where both vertices of the edge are hyperbolic. As illustrated in FIG. 3, edge 312 is a complex edge because both of the vertices for edge 312 are concave hyperbolic vertices.

In one embodiment, after classifying simple and complex edges in the polygonal mesh 300, the edges of the polygonal mesh 300 are analyzed to determine whether they are bounding, potentially bounding, or non-bounding. In one embodiment, concave edges may be classified as bounding (e.g., added to a set of bounding edges for a positive feature) when analyzing the polygonal mesh 300 for positive features, regardless of whether the edges are simple or complex. For example, when analyzing the polygonal mesh 300 to identify positive feature 305, the edge 312 may be classified as a bounding edge because edge 312 is a concave edge and the polygonal mesh 300 is being analyzed for positive features. Similarly, convex edges may be classified as bounding (e.g., added to a set of bounding edges for a negative feature) when analyzing the polygonal mesh 300 for negative features, regardless of whether the edges are simple or complex.

In another embodiment, simple convex (e.g., convex edges with fewer than two hyperbolic vertices) and simple planar edges (e.g., planar edges with fewer than two hyperbolic vertices) may be classified as non-bounding edges when analyzing the polygonal mesh for positive features. For example, edge 332 may be classified as non-bounding because edge 332 is a simple convex edge. Similarly, simple concave and planar edges may be classified as non-bounding for negative features.

Figure 4:
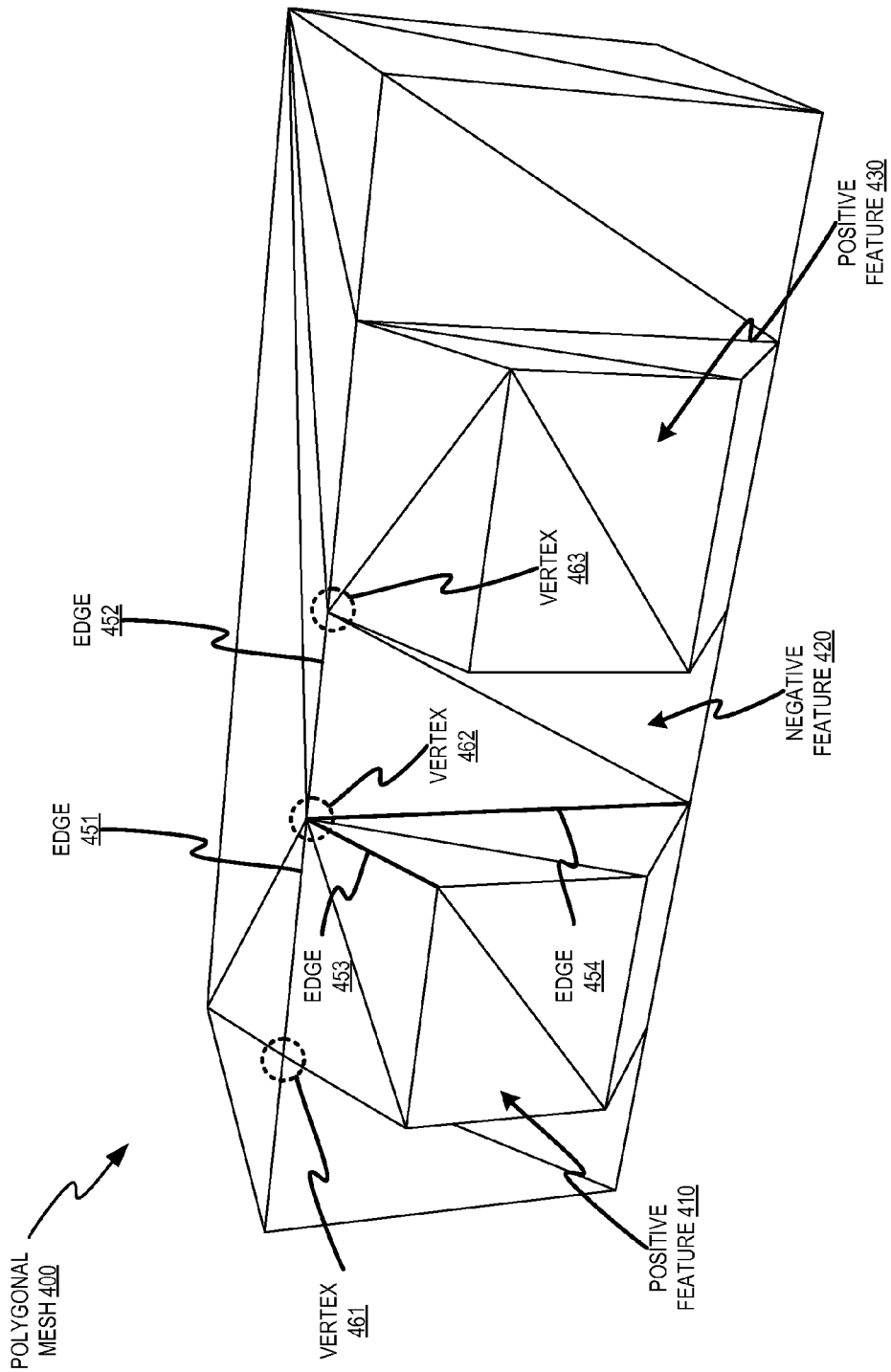
FIG. 4 is a diagram illustrating a perspective view of a polygonal mesh, according to another embodiment.

FIG. 4 is a diagram illustrating a perspective view of a polygonal mesh 400, according to another embodiment. Polygonal mesh 400 includes positive feature 410, positive feature 430, and negative feature 420. As discussed above, in conjunction with FIG. 3, edges and vertices of a polygonal mesh may be analyzed to classify the edges as convex, concave, or planar, to classify vertices as convex hyperbolic, convex hyperbolic, or non-hyperbolic, and to further classify edges as simple or complex. Convex edges may be classified as bounding for negative features and concave edges may be classified as bounding for positive features. Simple convex edges may be classified as non-bounding edges for positive features and simple concave edges may be classified as non-bounding for negative features. Simple planar edges may also be classified as non-bounding for both positive and negative features.

After the operations discussed above in conjunction with FIG. 3 are performed, the remaining edges in the polygonal mesh that have not been classified as bounding or non-bounding are complex edges (e.g., complex planar edges, complex convex edges, and complex concave edges). In one embodiment, complex edges where both vertices are convex hyperbolic are classified as potentially bounding when analyzing the polygonal mesh for positive features. For example, edge 451 may be classified as potentially bounding because edge 451 is a complex edge and the vertices 461 and 462 of the edge 451 are both convex hyperbolic. In another embodiment, complex edges where both vertices are concave hyperbolic are classified as potentially bounding when analyzing the polygonal mesh 400 for negative features. The remaining complex edges that have one convex hyperbolic vertex and one concave hyperbolic vertex are classified as non-bounding, regardless of whether the polygonal mesh 400 is analyzed for positive features or negative features.

As discussed above, a convex hyperbolic vertex is incident to at least two convex edges and one concave edge and a concave hyperbolic vertex is incident to at least two concave edges incident and a convex edge. In one embodiment, a convex hyperbolic vertex may represent a point where a negative incident feature or sub-feature, containing at least one strictly concave edge, is bounded by a folded positive incident feature or sub-feature containing at least a pair of strictly convex edges that bookend the negative incident feature or sub-feature. The edges that bookend the negative incident feature or sub-feature can be identified as the first strictly convex edges encountered when enumerating the incident edges starting from a strictly concave edge within the negative feature, in each rotational direction (e.g., in a clockwise and counter-clockwise direction). In one embodiment, edges that bookend positive or negative features (e.g., a bookend edge) may be edges that bound an incident feature or sub-feature locally at a vertex. For example, as illustrated in FIG. 4, vertex 462 is a convex hyperbolic vertex. Edge 452 and edge 453 are edges that bookend (e.g., bound) the negative feature 420 that is incident to vertex 462. Edge 452 is identified by moving along the different edges that radiate from vertex 462 in a counter-clockwise direction starting from the edge 454 (e.g., a concave edge within negative feature 420) up to the first convex edge (e.g., edge 452). Edge 453 is identified as an edge that also bookends (e.g., bounds) the negative feature 420 by moving along the different edges that radiate from vertex 462 in a clockwise direction starting from the edge 454 (e.g., a concave edge within negative feature 420) up to the first convex edge (e.g., edge 453). Edges 452 and 453 bookend the negative feature (e.g., edges 452 and 453 are bookend edges) because edges 452 and 453 bound the negative feature 420 locally at the vertex 462. In another embodiment, a concave hyperbolic vertex represents a point where a positive incident feature or sub-feature, containing at least one strictly convex edge, is bounded by a folded negative incident feature or sub-feature containing at least a pair of strictly concave edges that bookend the positive incident feature or sub-feature. The edges that bookend the positive incident feature or sub-feature can be identified as the first concave edges encountered when enumerating the incident edges starting from a strictly convex edge within the positive feature, in each rotational direction.

In one embodiment, complex edges that bookend a negative incident feature or sub-feature at either of their convex hyperbolic vertices are classified as non-bounding when analyzing the polygonal mesh 400 for positive features. As illustrated in FIG. 4, edges 452 and 453 bookend negative feature 420. The complex edge 452 is classified as non-bounding because it bookends the negative feature 420 (at both of its vertices). The edge 453 is a simple convex edge and may be classified as non-bounding for positive features. In another embodiment, complex edges that bookend a positive incident feature or sub-feature at either of their concave hyperbolic vertices are classified as non-bounding when analyzing the polygonal mesh 400 for negative features.

Figure 5:
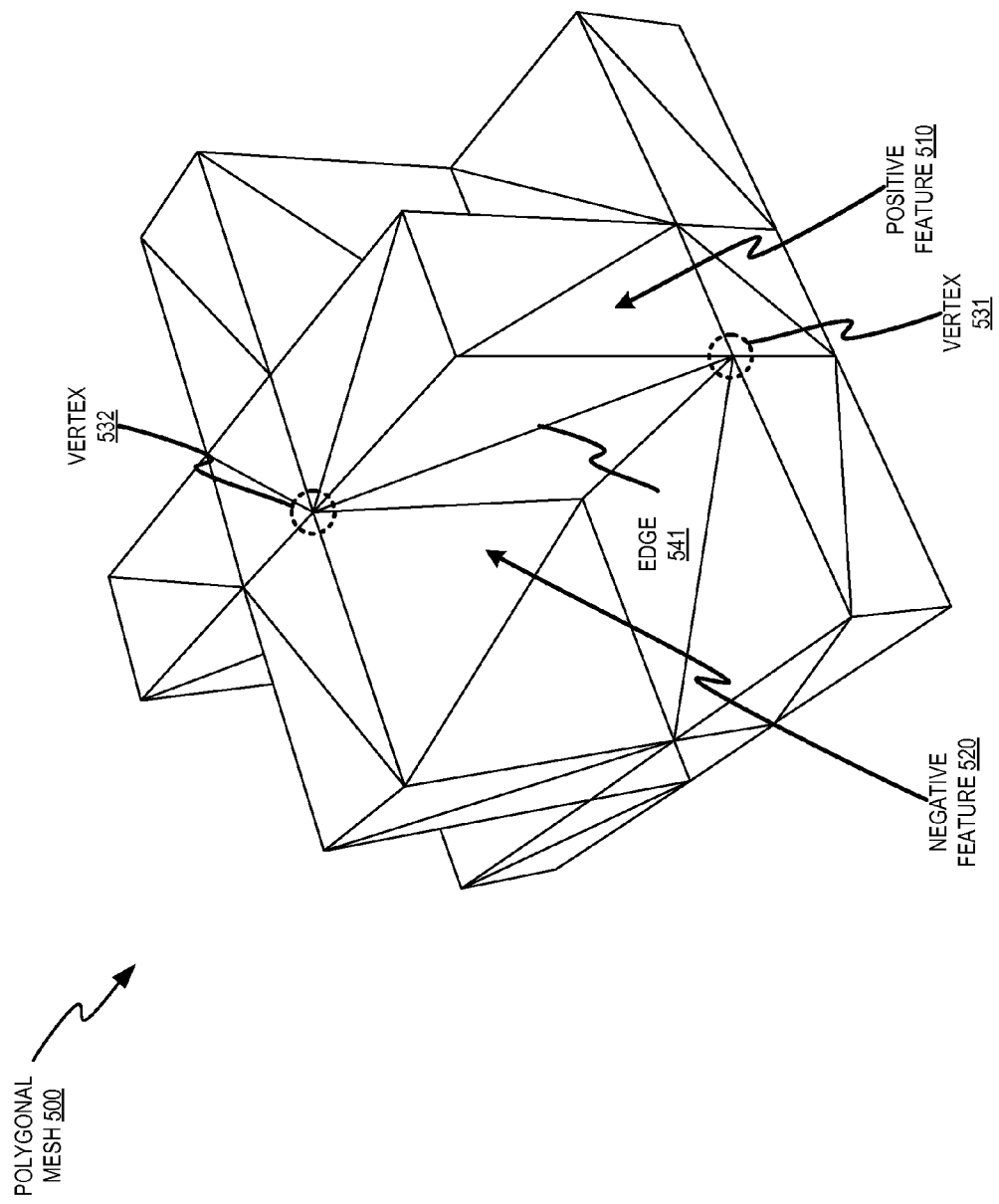
FIG. 5 is a diagram illustrating a perspective view of a polygonal mesh, according to a further embodiment.

FIG. 5 is a diagram illustrating a perspective view of a polygonal mesh 500, according to a further embodiment. The polygonal mesh 500 includes a positive feature 510 and a negative feature 520. As discussed above, in conjunction with FIG. 4, complex edges that bookend a negative incident feature or sub-feature at either of their convex hyperbolic vertices are classified as non-bounding when analyzing a polygonal mesh for positive features and complex edges that bookend a positive incident feature or sub-feature at either of their concave hyperbolic vertices are classified as non-bounding when analyzing the polygonal mesh for negative features. After classifying edges that bookend positive or negative features as non-bounding, complex planar edges may be analyzed to determine whether the complex planar edges should be classified as non-bounding. In one embodiment, complex planar edges that are internal to a negative incident feature or sub-feature (e.g., are part of a negative incident feature or sub-feature) at either of their convex hyperbolic vertices may be classified as non-bounding for positive features. As illustrated in FIG. 5, edge 541 is a complex planar edge that has two vertices 531 and 532. The vertices 531 and 532 are convex hyperbolic vertices. The planar edge is internal to the negative feature 520 (e.g., is part of the negative feature 520) and is classified as non-bounding. In another embodiment, planar complex edges that are found to be internal to a positive incident feature or sub-feature (e.g., are part of the positive incident feature or sub-feature) at either of their concave hyperbolic vertices may be classified as non-bounding for negative features.

Figure 6A:
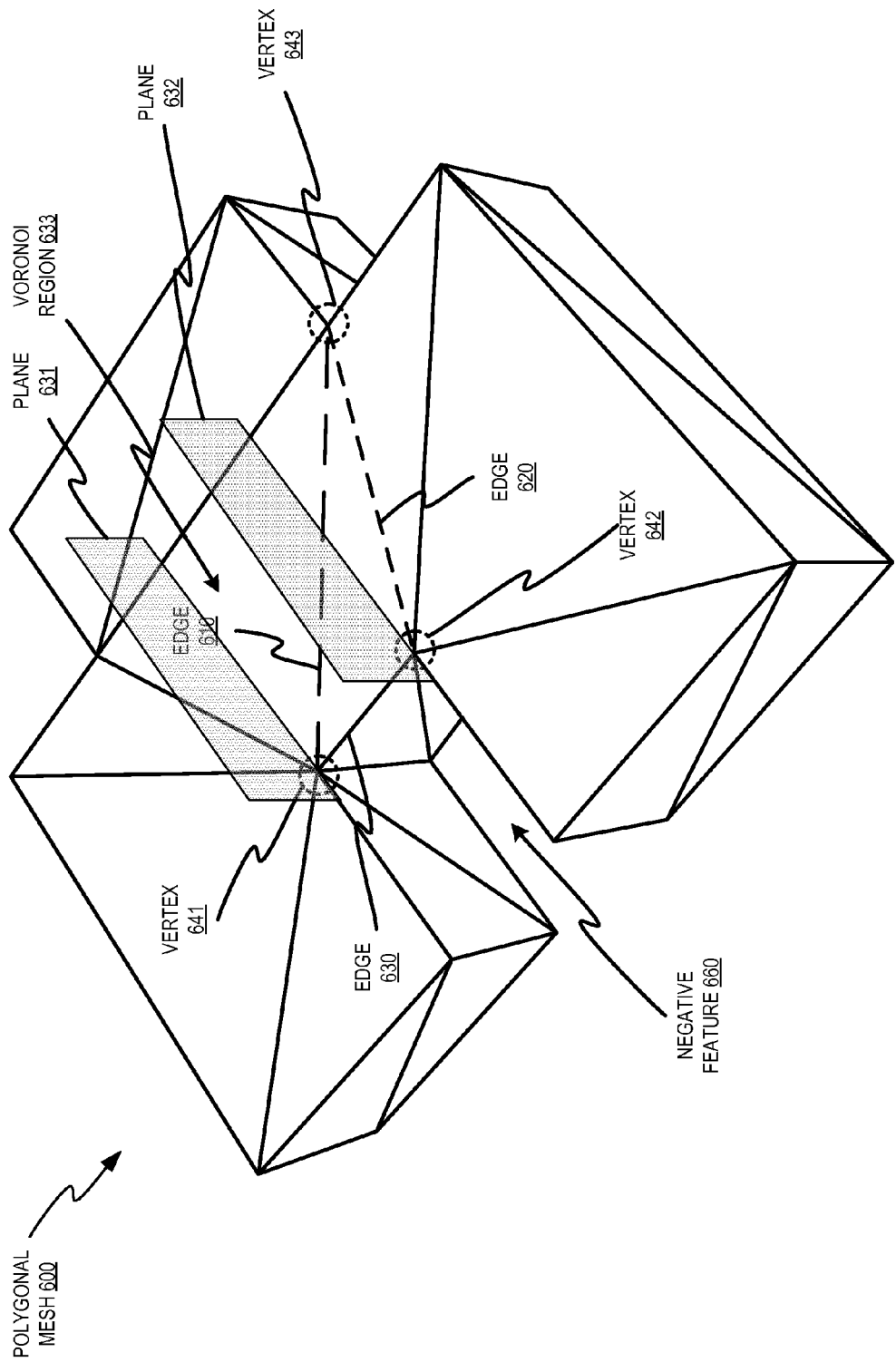
FIG. 6A is a diagram illustrating a perspective view of a polygonal mesh, according to a one embodiment.

FIG. 6A is a diagram illustrating a perspective view of a polygonal mesh 600, according to a one embodiment. The polygonal mesh 600 includes a negative feature 660 and edges 610, 620, and 630. The polygonal mesh 600 also includes vertices 641, 642, and 643. After performing the actions or operations discussed above in conjunction with FIGS. 2-5, the edges in a polygonal mesh have been classified as bounding, potentially bounding, or non-bounding. In one embodiment, one or more complex edges may still be classified as potentially bounding after performing the actions or operations discussed above in conjunction with FIGS. 2-5. Each complex edge that is still classified as potentially bounding may be analyzed to determine whether the complex edge is dominated (as discussed below) by another complex edge that is also potentially bounding. In one embodiment, the analysis of the complex edges may be based on the geometric relationships between adjacent potentially bounding edges.

In one embodiment, when multiple adjacent complex edges are potentially bounding, one of the complex edges may typically be a better edge to separate the adjacent features than the others edges. For each potentially bounding complex edge, the other two edges of each of the complex edge's two incident wing edges may be analyzed to determine whether the other two edges dominate the complex edge. For example, for the edge 610, the edge 620 and the edge 630 (e.g., a triangle that includes edge 610 and two incident wing edges for the edge 610) are analyzed to determine whether the potentially bounding edge 620 dominates the edge 610.

In one embodiment, the edge 610 may be dominated by the edge 620 if three conditions or criteria are met. The first condition or criterion is that the edge 620 should also be a potentially bounding edge for the feature that is being identified. For example, if the polygonal mesh 600 is being analyzed to identify positive features, the edge 620 should also be a potentially bounding edge for positive features. As illustrated in FIG. 6A, the edge 620 is also potentially bounding for positive features. The second condition or criterion may be that the third edge in the wing triangle (e.g., edge 630) should bookend an opposite feature than the feature that is being identified. For example, if the polygonal mesh 600 is being analyzed to identify positive features, the edge 630 should bookend a negative feature at the vertex 641. As illustrated in FIG. 6A, the edge 630 bookends the negative feature 660 of the polygonal mesh 600. In another example, if the polygonal mesh 600 is being analyzed to identify negative features, the third edge should bookend a positive feature.

The third condition or criterion may be that the opposite vertex of the edge being tested (e.g., vertex 643) is located beyond the Voronoi region 633 of the third edge of the wing triangle (e.g., edge 630). In one embodiment, this third condition or criterion may be tested by determining whether the opposite vertex of the edge being tested (e.g., vertex 643) is outside of a Voronoi region 633. The Voronoi region 633 is bound by planes 631 and 632 (e.g., the Voronoi region 633 is the space, volume, or region) between the planes 631 and 632). In one embodiment, the normals of the planes 631 and 632 may be equal to the normalized direction of the third wing edge from the first vertex of the third edge of the wing triangle (e.g., vertex 641) to the second vertex of the third edge of the wing triangle (e.g., vertex 642). If the opposite vertex of the edge being analyzed is not located between the two planes 631 and 632, the vertex is found to be located beyond the Voronoi region 633 of the third wing edge (e.g., edge 630). As illustrated in FIG. 6A, the vertex 643 is located to the right of (e.g., beyond) the Voronoi region 633 bounded by the plane 631 and the plane 632. Because all three conditions or criteria have been met or satisfied, the edge 610 is dominated by the edge 620. In one embodiment, potentially bounding complex edges which are dominated by other potentially bounding complex edges are reclassified as non-bounding. In another embodiment, although edge 620 dominates edge 610, edge 620 may also be analyzed to determine whether edges adjacent to edge 620 dominate the edge 620.

In one embodiment, an edge may be dominated by another edge if both edges are potentially bounding edges and both edges are incident to the same hyperbolic vertex at one end (e.g., edge 610 and edge 620 are both incident to vertex 643). The edges may also be incident to different hyperbolic vertices of a shared convex edge at their other ends (e.g., edge 610 is incident to vertex 641 on the other end and edge 620 is incident to vertex 642 on the other end). It may be desirable to include one of two potentially bounding edges in the set of bounding edges, as opposed to the other. Referring to FIG. 6A, the potentially bounding edge 610 represents an inferior choice because vertex 643 is outside of the Voronoi region 633 defined by the planes 631 and 632.

Figure 6B:
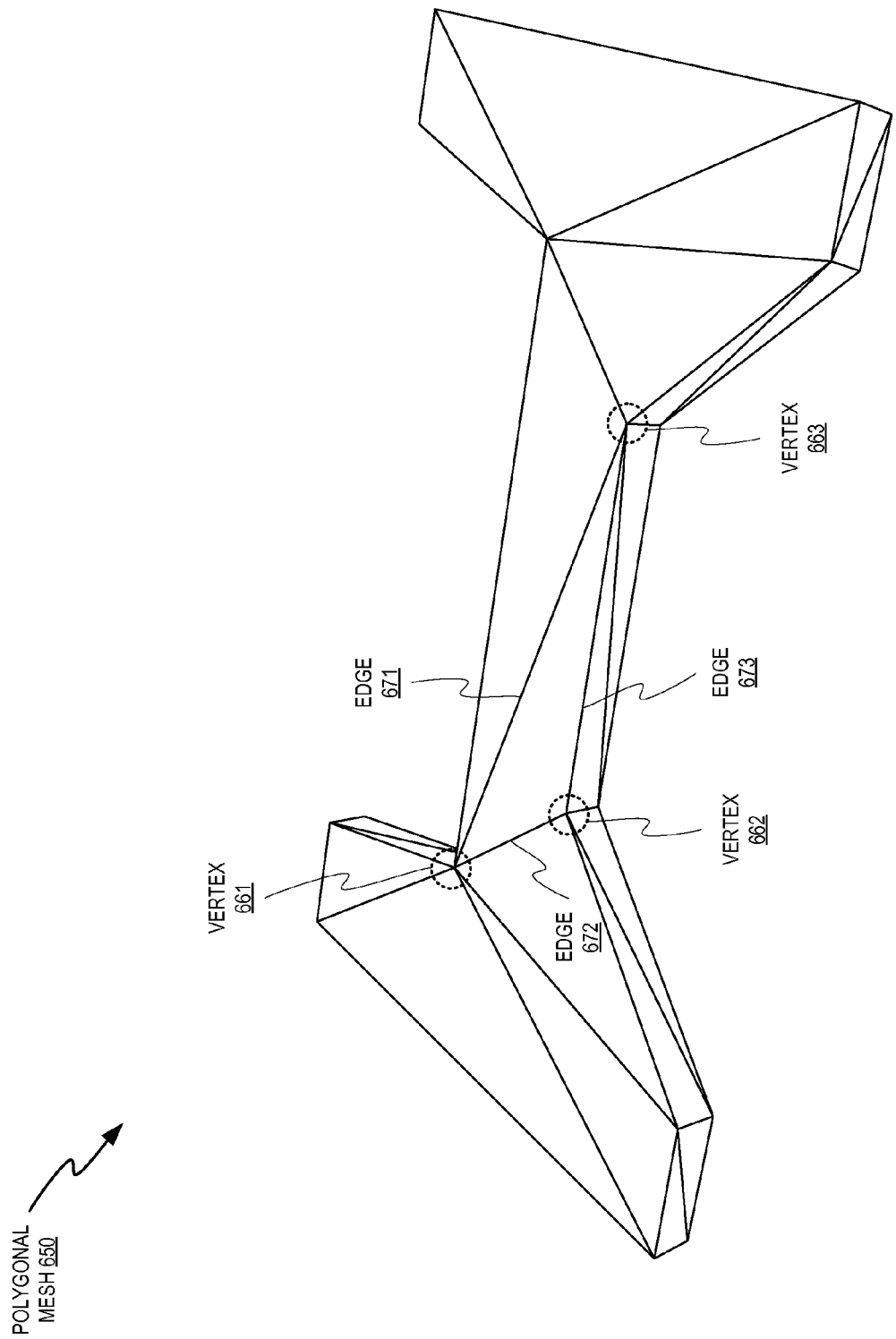
FIG. 6B is a diagram illustrating a perspective view of a polygonal mesh, according to another embodiment.

FIG. 6B is a diagram illustrating a perspective view of a polygonal mesh 650, according to one embodiment. The polygonal mesh 650 includes vertices 661, 662, and 663, and edges 671, 672, and 673. As discussed above, the edges of the polygonal mesh 650 may be analyzed to determine whether the edges of the polygonal mesh 650 are bounding for a positive feature or a negative feature. Some edges in the polygonal mesh 650 may be classified as potentially bounding. In one embodiment, potentially bounding edges may be analyzed to determine whether a first potentially bounding edge dominates a second potentially bounding edge. For example, two potentially bounding edges 671 and 672 are incident to the same convex hyperbolic vertex 661, at one end, and different convex hyperbolic vertices 662 and 663, respectively, of a shared convex edge 673, at the other. In one embodiment, it may be desirable to prefer one of the potentially bounding edges (e.g., edge 672) to the other (e.g., edge 671), classifying the other (e.g., edge 671) as non-bounding. In one embodiment, the potentially bounding edge 671 may represent an inferior choice if the point on edge 673 to which the shared hyperbolic vertex 661 is nearest is vertex 662 (rather than vertex 663 or some other intermediate point along edge 673). For example, the potentially bounding edge 671 may represent an inferior choice if vertex 661 is in the Voronoi region of vertex 662 rather than that of edge 673 or vertex 663 (e.g., the vertex on edge 673 to which edge 671 is incident). The potentially bounding edge 671 can be safely classified as non-bounding in favour of 672 (which remains classified as potentially bounding). The edge 672 may be a better choice to add to a set of bounding edges (e.g., to classify as a bounding edge) than edge 671. The edge 672 may also be analysed to determine whether the edge 672 is dominated by another complex edge that is also potentially bounding.

Figure 7:
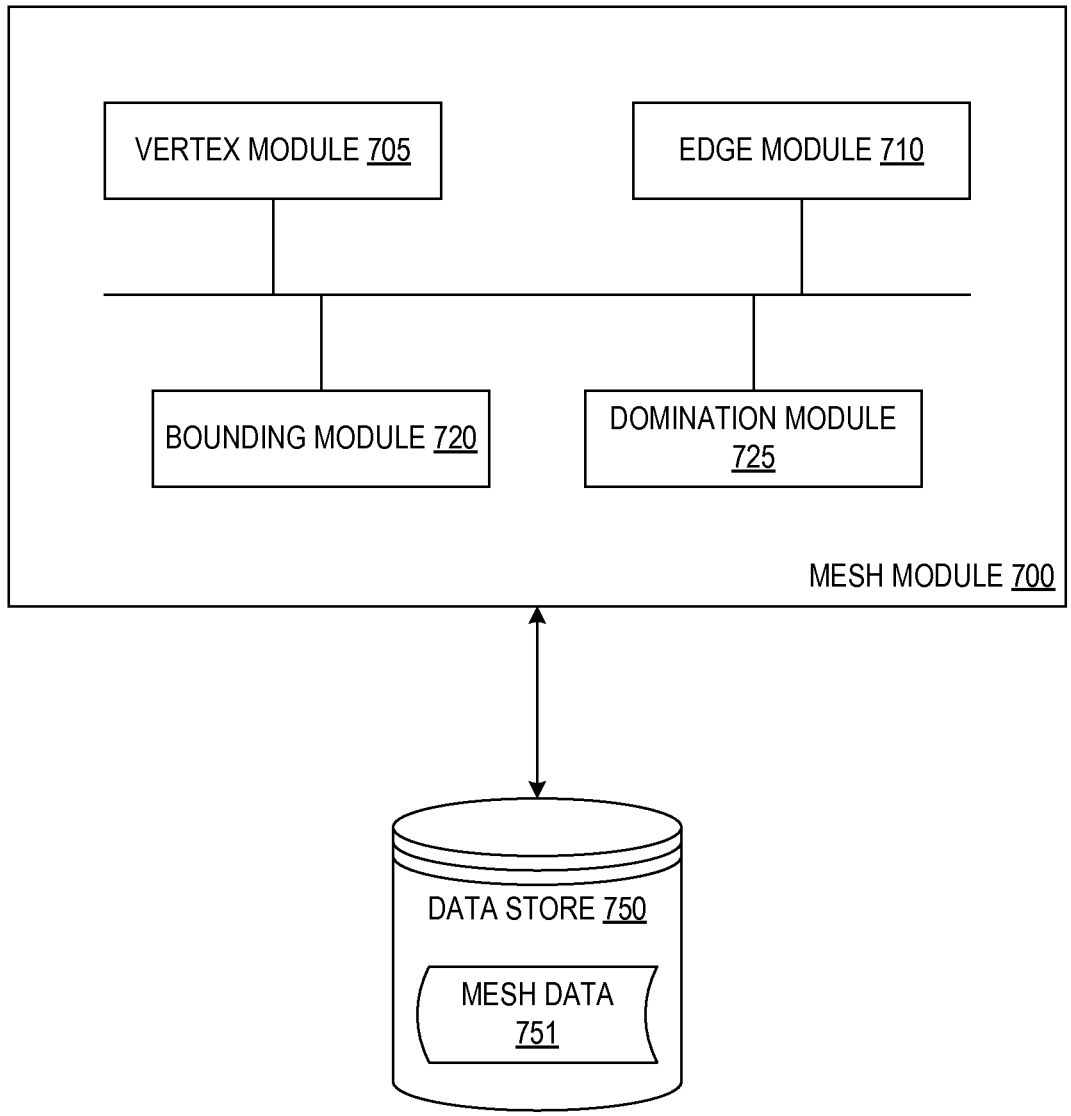
FIG. 7 is a block diagram illustrating a mesh module, according to one embodiment.

FIG. 7 is a block diagram illustrating a mesh module 700, according to one embodiment. The mesh module 700 includes a vertex module 705, an edge module 710, a bounding module 720, and a domination module 725. More or less components may be included in the mesh module 700 without loss of generality. For example, two of the modules may be combined into a single module, or one of the modules may be divided into two or more modules. In one embodiment, the mesh module 700 may reside on a computing device (as illustrated in FIG. 7). In another embodiment, one or more of the modules may reside on different computing devices (e.g., different desktop computers or server computers). The mesh module 700 is communicatively coupled to the data store 750. For example, the mesh module 700 may be directly coupled to the data store 750 or may be coupled to the data store 750 via one or more networks. The one or more networks may be a public network (e.g., the Internet), a private network (e.g., a local area network (LAN) or wide area network (WAN)), a wired network (e.g., Ethernet network), a wireless network (e.g., an 802.11 network), a cellular network (e.g., a Long Term Evolution (LTE) network), a broadcast network, or any combination thereof.

The data store 750 may be a memory (e.g., random access memory), a cache, a drive (e.g., a hard drive), a flash drive, a database system, or another type of component or device capable of storing data. The data store 750 may also include multiple storage components (e.g., multiple drives or multiple databases) that may also span multiple computing devices (e.g., multiple server computers). The data store 750 includes mesh data 751. In one embodiment, the mesh data 751 may be data used to represent polygonal meshes. For example, the mesh data 751 may include data indicating the location of vertices, indicating which edges contain which vertices, and indicating how edges are connected to each other. In another example, the mesh data 751 may also include data indicating the various faces of polygonal meshes.

In one embodiment, the vertex module 705 may analyze vertices in a polygonal mesh to determine whether the vertices are hyperbolic or non-hyperbolic. For example, the vertex module 705 may classify a vertex that is incident to two convex edges and a concave edge as a convex hyperbolic vertex (as discussed in conjunction with FIG. 3). In another example, the vertex module 705 may classify a vertex that is incident to two concave edges and one convex edge as a concave hyperbolic vertex (as discussed in conjunction with FIG. 3). In a further example, the vertex module 705 may classify a vertex that is not incident to at least one convex edge and at least one concave edge as non-hyperbolic (as discussed in conjunction with FIG. 3).

In one embodiment, the edge module 710 may analyze edges in a polygonal mesh and may classify the edges as a concave, convex, or planar. For example, the edge module 710 may analyze the dihedral angle of the faces incident to an edge and may classify the edge as convex if the dihedral angle is greater than a threshold (as discussed above in conjunction with FIG. 3). In another example, the edge module 710 may analyze the dihedral angle of the faces incident to an edge and may classify the edge as concave if the dihedral angle is less than a threshold (as discussed above in conjunction with FIG. 3). In a further example, the edge module 710 may analyze the dihedral angle of the faces incident to an edge and may classify the edge as concave if the dihedral angle is zero (as discussed above in conjunction with FIG. 3). In another embodiment, the edge module 710 may classify edges as simple edges or complex edges. For example, the edge module 710 may classify an edge as simple if the edge has fewer than two hyperbolic vertices (as discussed above in conjunction with FIG. 3). In another example, the edge module 710 may classify an edge as complex if the edge has two hyperbolic vertices (as discussed above in conjunction with FIG. 3).

In one embodiment, the bounding module 720 may identify edges in the polygonal mesh as bounding, potentially bounding, or non-bounding. For example, the bounding module 720 may classify convex edges as bounding edges when the mesh module 700 identifies negative features and may classify concave edges as bounding edges when the mesh module 700 identifies positive features (as discussed above in conjunction with FIG. 3). In another example, the bounding module 720 may classify simple convex edges as non-bounding when the mesh module 700 identifies positive features, may classify simple concave edges as non-bounding when the mesh module 700 identifies negative features, and may classify simple planar edges as non-bounding (as discussed above in conjunction with FIG. 3). In a further example, the bounding module 720 may classify complex edges that bookend negative incident features or positive incident features (as discussed above in conjunction with FIG. 4). In one example, the bounding module 720 may also classify planar complex edges as non-bounding if planar complex edges are internal to a negative incident feature or a positive incident feature (as discussed above in conjunction with FIG. 5). In another example, the bounding module 720 may also identify potentially bounding complex edges as non-bounding if the complex edges are dominated by one or more complex edges (as discussed above in conjunction with FIGS. 6A and 6B).

In one embodiment, the domination module 725 may analyze complex edges to determine whether a potentially bounding edge is dominated by another complex edge. For example, the domination module 725 may determine whether three conditions or criteria are satisfied for a potentially bounding complex edge (as discussed above in conjunction with FIGS. 6A and 6B). If the three conditions or criteria are satisfied for the potentially bounding complex edge, the domination module 725 may reclassify the potentially bounding complex edge as non-bounding. The bounding module 720 may communicate with the domination module 725 to determine whether a complex edge is dominated by another complex edge.

In one embodiment, the mesh module 700 may remove positive features or negative features from a polygonal mesh after the features have been identified. For example, referring to FIG. 1, after the mesh module 700 identifies negative feature 110 the mesh module 700 may fill in the negative feature 110 to remove the negative features. In another example, referring to FIG. 1, after the mesh module 700 identifies positive feature 120, the mesh module 700 may remove the positive feature 120. The resulting mesh 150 (after the negative feature 110 and positive feature 120) have been removed may be a polygonal mesh that includes fewer edges, faces, and vertices than the original polygonal mesh 100 (e.g., may be a simpler mesh than polygonal mesh 100).

Figure 8:
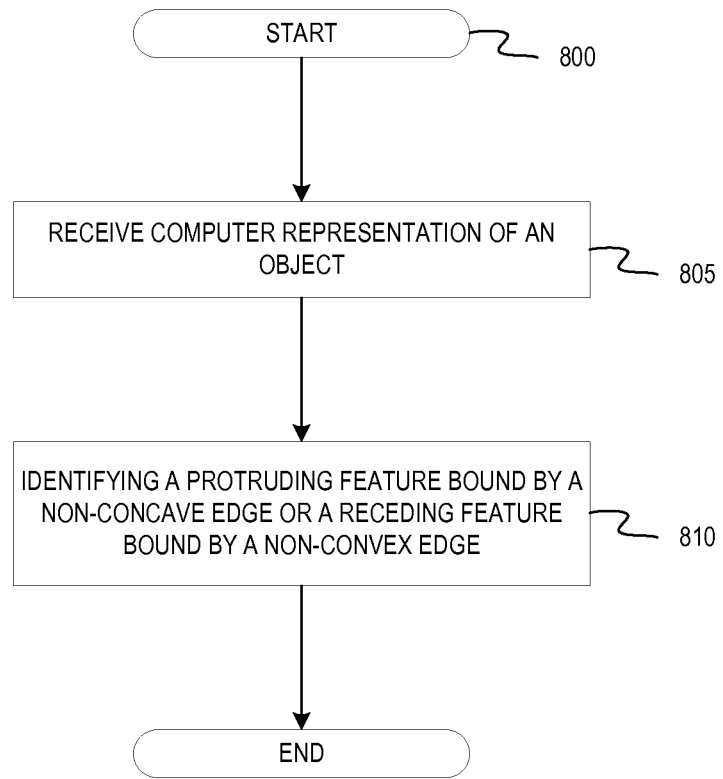
FIG. 8 is a flow diagram illustrating a method of identifying features in a computer representation of an object (e.g., a polygonal mesh), according to one embodiment.
Figure 9:
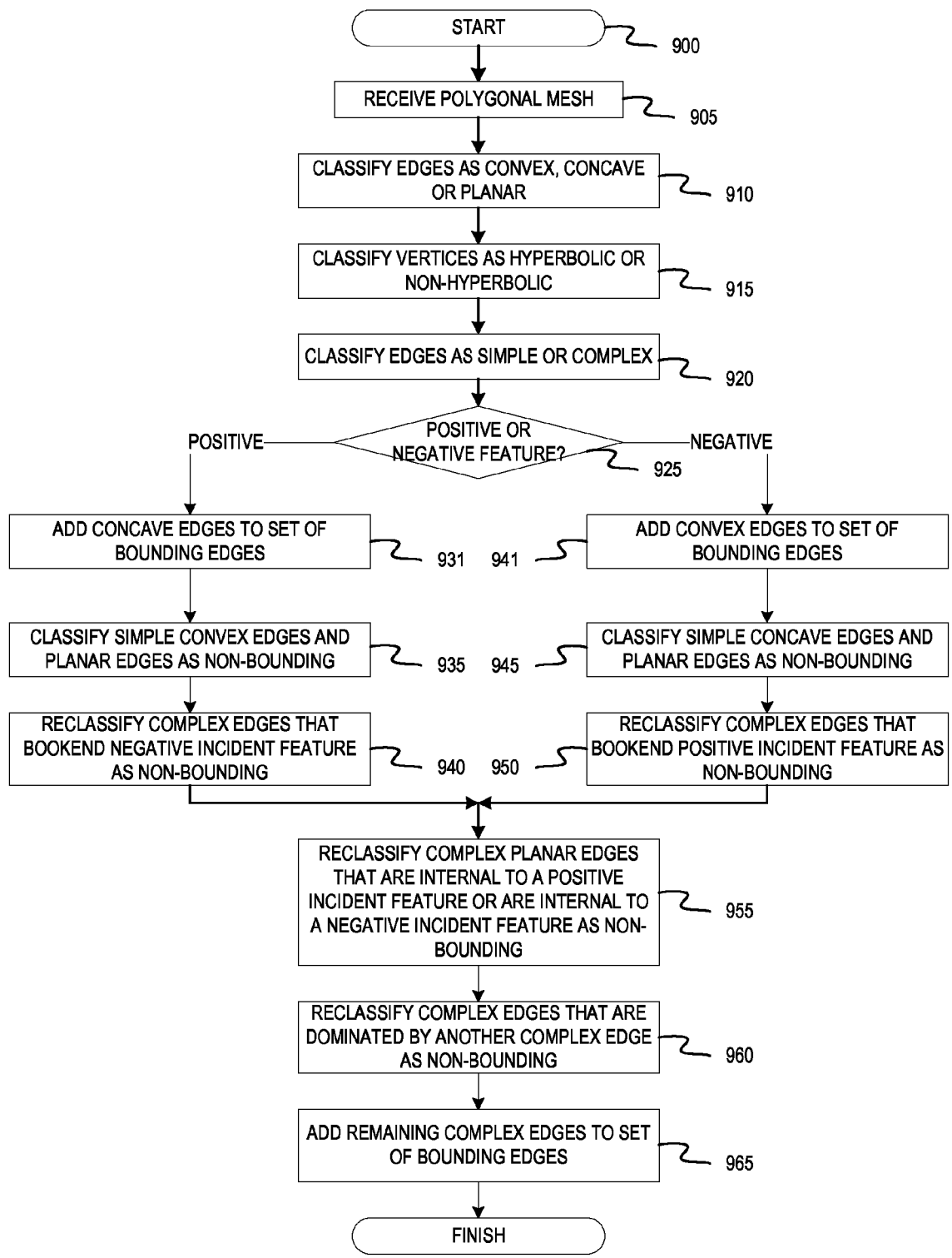
FIG. 9 is a flow diagram illustrating a method of identifying features in a polygonal mesh, according to one embodiment.

FIGS. 8 through 9 are flow diagrams illustrating methods for identifying features. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 8 is a flow diagram illustrating a method 800 of identifying features in a computer representation of an object (e.g., a polygonal mesh), according to one embodiment. The method 800 may be performed by processing logic that comprises hardware (e.g., circuitry, dedicated logic, programmable logic, microcode, etc.), software (e.g., instructions run on a processor to perform hardware simulation), or a combination thereof. In one embodiment, method 800 may be performed by a mesh module on a computing device, as illustrated in FIG. 7.

Referring to FIG. 8 the method 800 begins at block 805 where the method 800 receives a computer representation of an object. For example, the method 800 may receive a polygonal mesh that includes edges, vertices, and faces. At block 810, the method 800 identifies a protruding feature (e.g., a convex feature or a positive feature) that is bound by a non-concave edge (e.g., a planar edge or a convex edge) or identifies a receding feature (e.g., a concave feature or a negative feature) that is bound by a non-convex edge (e.g., a planar edge or a concave edge). After block 810, the method 800 ends.

FIG. 9 is a flow diagram illustrating a method 900 of identifying features in a polygonal mesh (e.g., a computer representation of an object), according to one embodiment. The method 900 may be performed by processing logic that comprises hardware (e.g., circuitry, dedicated logic, programmable logic, microcode, etc.), software (e.g., instructions run on a processor to perform hardware simulation), or a combination thereof. In one embodiment, method 900 may be performed by a mesh module on a computing device, as illustrated in FIG. 7.

Referring to FIG. 9 the method 900 begins at block 905 where the method 900 receives a polygonal mesh. At block 910, the method 900 classifies the edges in the polygonal mesh as convex, concave, or planar (as discussed in conjunction with FIG. 3). The method 900 also classifies vertices in the polygonal mesh as hyperbolic or non-hyperbolic at block 915 (as discussed in conjunction with FIG. 3). At block 920, the method 900 further classifies the edges in the polygonal mesh as simple or complex (as discussed above in conjunction with FIG. 3). At block 925, the method 900 may determine whether to identify a positive feature of a negative feature in the polygonal mesh. For example, the method 900 may receive user input (e.g., via an input device such as a keyboard, mouse, or touchscreen) indicating whether to identify a positive feature or a negative feature. In another example, the method 900 may access data, such as a configuration file, or a flag to determine whether to identify a positive feature or a negative feature in the polygonal mesh.

If a positive feature is to be identified, the method 900 proceeds to block 931 where concave edges are added to the set of bounding edges for the positive feature (as discussed above in conjunction with FIG. 3). At block 935 the method 900 classifies simple convex edges and simple planar edges as non-bounding (as discussed above in conjunction with FIG. 3). The method 900 proceeds to block 940 where the method 900 reclassifies complex edges that bookend a negative incident feature as non-bounding (as discussed above in conjunction with FIG. 4). After block 940, the method proceeds to block 955. If a negative feature is to be identified, the method 900 proceeds to block 941 where convex edges are added to the set of bounding edges for the negative feature (as discussed above in conjunction with FIG. 3). At block 945 the method 900 classifies simple concave edges and simple planar edges as non-bounding (as discussed above in conjunction with FIG. 3). The method 900 proceeds to block 950 where the method 900 reclassifies complex edges that bookend a positive incident feature as non-bounding (as discussed above in conjunction with FIG. 4). After block 950, the method proceeds to block 955.

At block 955, the method 900 reclassifies complex planar edges that are internal to a positive incident feature or a negative incident feature as non-bounding (as discussed above in conjunction with FIG. 5). The method 900 reclassifies complex edges that are dominated by other complex edges as non-bounding at block 960 (as discussed above in conjunction with FIGS. 6A and 6B). After block 960, the method 900 ends.

Figure 10:
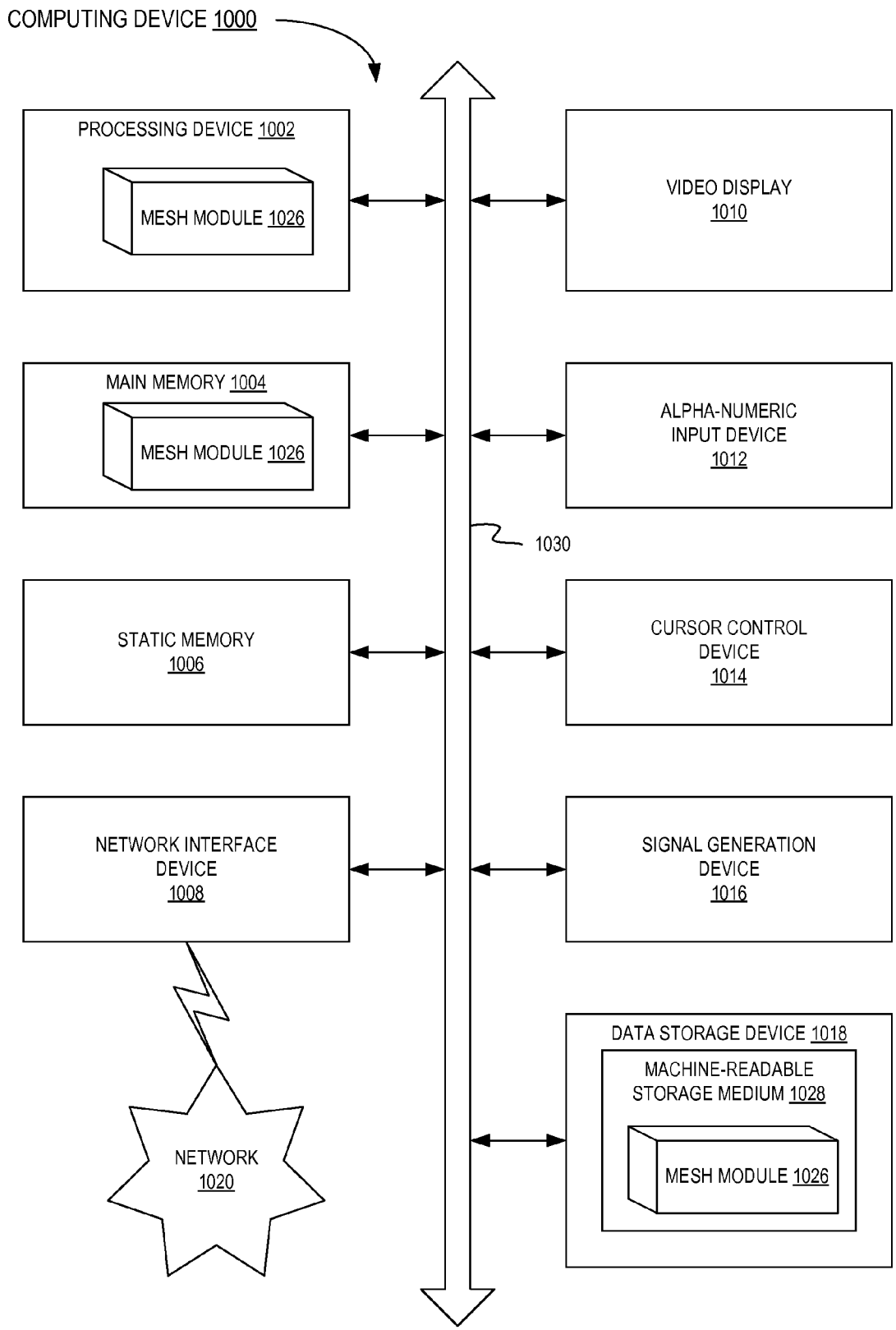
FIG. 10 is a block diagram of a computing device, in accordance with one embodiment.

FIG. 10 illustrates a diagrammatic representation of a computing device 1000 within which a set of instructions, for causing the machine to perform any one or more of the methodologies discussed herein, may be executed. The computing device 1000 may be a computing device (e.g., a server computer) within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 1000 includes a processing device (e.g., a processor) 1002, a main memory 1004 (e.g., read-only memory (ROM), flash memory, dynamic random access memory (DRAM) such as synchronous DRAM (SDRAM)), a static memory 1006 (e.g., flash memory, static random access memory (SRAM)) and a data storage device 1018, which communicate with each other via a bus 1030.

Processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute mesh module 1026 for performing the operations and steps discussed herein.

The computing device 1000 may further include a network interface device 1008 which may communicate with a network 1020. The computing device 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and a signal generation device 1016 (e.g., a speaker). In one embodiment, the video display unit 1010, the alphanumeric input device 1012, and the cursor control device 1014 may be combined into a single component or device (e.g., an LCD touch screen).

The data storage device 1018 may include a computer-readable storage medium 1028 on which is stored one or more sets of instructions (e.g., instructions of mesh module 1026) embodying any one or more of the methodologies or functions described herein. The mesh module 1026 may also reside, completely or at least partially, within the main memory 1004 and/or within the processing device 1002 during execution thereof by the computing device 1000, the main memory 1004 and the processing device 1002 also constituting computer-readable media. The instructions may further be transmitted or received over a network 1020 via the network interface device 1008.

While the computer-readable storage medium 1028 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "classifying," "reclassifying," "determining," "adding," "analyzing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclo-

What is claimed is:

1. A method comprising:
receiving a computer representation of an object;
identifying, by a processing device, a protruding feature of the computing representation of the object bound by a non-concave edge or a receding feature of the computer representation of the object bound by a non-convex edge, wherein the computer representation of the object comprises a polygonal mesh comprising a first plurality of faces, a second plurality of edges, and a third plurality of vertices, wherein the protruding feature comprises a positive feature of the polygonal mesh, and wherein the receding feature comprises a negative feature of the polygonal mesh, the method further comprising:
determining whether to identify the positive feature of the polygonal mesh or the negative feature of the polygonal mesh; and
identifying, by the processing device, a set of bounding edges for the positive feature of the polygonal mesh or for the negative feature of the polygonal mesh, wherein the set of bounding edges comprises one or more of a convex edge or a planar edge when identifying the positive feature of the polygonal mesh and wherein the set of bounding edges comprises one or more of a concave edge or the planar edge when identifying the negative feature of the polygonal mesh.

2. The method of claim 1, wherein identifying the set of bounding edges comprises:
classifying each edge in the second plurality of edges as convex, planar, or concave.

3. The method of claim 2, wherein identifying the set of bounding edges further comprises:
classifying each vertex in the third plurality of vertices as one or more of non-hyperbolic, convex hyperbolic, or concave hyperbolic.

4. The method of claim 3, wherein identifying the set of bounding edges further comprises:
further classifying each edge in the second plurality of edges as a simple edge or a complex edge.

5. The method of claim 4, wherein identifying the set of bounding edges further comprises:
adding a set of concave edges to the set of bounding edges when identifying the positive feature of the polygonal mesh; and
adding a set of convex edges to the set of bounding edges when identifying the negative feature of the polygonal mesh.

6. The method of claim 5, wherein identifying the set of bounding edges further comprises:
classifying a first set of complex edges with two convex hyperbolic vertices as potentially bounding when identifying the positive feature of the polygonal mesh; and
classifying a second set of complex edges with two concave hyperbolic vertices as potentially bounding when identifying the negative feature of the polygonal mesh.

7. The method of claim 6, wherein identifying the set of bounding edges further comprises:
reclassifying a first subset of complex edges that bound one or more negative incident features at a vertex as non-bounding; and
reclassifying a second subset of complex edges that bound one or more positive incident features at the vertex as non-bounding.

8. The method of claim 7, wherein identifying the set of bounding edges further comprises:
reclassifying a set of complex planar edges that are internal to the one or more negative incident features or that are internal to the one or more positive incident features as non-bounding.

9. The method of claim 8, wherein identifying the set of bounding edges further comprises:
analyzing each complex edge that is classified as potentially bounding to determine whether the complex edge is dominated by another complex edge that is classified as potentially bounding, wherein a first complex edge dominates a second complex edge when a first vertex shared between the first complex edge and the second complex edge is within a Voronoi region of a second vertex of the first complex edge;
reclassifying a set of complex edges that are dominated by other complex edges as non-bounding; and
adding any remaining complex edges classified as potentially bounding to the set of bounding edges.

10. The method of claim 1, further comprising:
generating a simplified computer representation of the object by removing the identified protruding feature; and
storing the simplified computer representation for rendering the simplified computer representation of the object on a display.

11. An apparatus comprising:
a memory configured to store a computer representation of an object; and
a processing device configured to:
receive the computer representation of the object;
identify a protruding feature of the computing representation of the object bound by a non-concave edge or a receding feature of the computer representation of the object bound by a non-convex edge, wherein the computer representation of the object comprises a polygonal mesh comprising a first plurality of faces, a second plurality of edges, and a third plurality of vertices, wherein the protruding feature comprises a positive feature of the polygonal mesh, and wherein the receding feature comprises a negative feature of the polygonal mesh, and wherein the processing device is further configured to:
determine whether to identify the positive feature of the polygonal mesh or the negative feature of the polygonal mesh; and
identify a set of bounding edges for the positive feature of the polygonal mesh or for the negative feature of the polygonal mesh, wherein the set of bounding edges comprises one or more of a convex edge or a planar edge when identifying the positive feature of the polygonal mesh and wherein the set of bounding edges comprises one or more of a concave edge or the planar edge when identifying the negative feature of the polygonal mesh.

12. The apparatus of claim 11, wherein the processing device identifies the set of bounding edges by:
classifying each edge in the second plurality of edges as convex, planar, or concave;
classifying each vertex in the third plurality of vertices as one or more of non-hyperbolic, convex hyperbolic, or concave hyperbolic; and
classifying each edge in the second plurality of edges as a simple edge or a complex edge.

13. The apparatus of claim 12, wherein the processing device further identifies the set of bounding edges by:

adding a set of concave edges to the set of bounding edges when identifying the positive feature of the polygonal mesh; and adding a set of convex edges to the set of bounding edges when identifying the negative feature of the polygonal mesh.

14. The apparatus of claim 13, wherein the processing device further identifies the set of bounding edges by:

classifying a first set of complex edges with two convex hyperbolic vertices as potentially bounding when identifying the positive feature of the polygonal mesh; and classifying a second set of complex edges with two concave hyperbolic vertices as potentially bounding when identifying the negative feature of the polygonal mesh.

15. The apparatus of claim 14, wherein the processing device further identifies the set of bounding edges by:

reclassifying a first subset of complex edges that bound one or more negative incident features at a vertex as non-bounding;

reclassifying a second subset of complex edges that bound one or more positive incident features at a vertex as non-bounding; and reclassifying a set of complex planar edges that are internal to the one or more negative incident features or that are internal to the one or more positive incident features as non-bounding.

16. The apparatus of claim 15, wherein the processing device further identifies the set of bounding edges by:

analyzing each complex edge that is classified as potentially bounding to determine whether the complex edge is dominated by another complex edge that is classified as potentially bounding, wherein a first complex edge dominates a second complex edge when a first vertex shared between the first complex edge and the second complex edge is within a Voronoi region of a second vertex of the first complex edge;

reclassifying a set of complex edges that are dominated by other complex edges as non-bounding; and adding any remaining complex edges classified as potentially bounding to the set of bounding edges.

17. The apparatus of claim 11, wherein the processing device further to:

generate a simplified computer representation of the object by removing the identified protruding feature; and store the simplified computer representation for rendering the simplified computer representation of the object on a display.

18. A non-transitory computer readable storage medium having instructions that, when executed by a processing device, cause the processing device to perform operations comprising:

receiving a computer representation of an object;

identifying, by the processing device, a protruding feature of the computing representation of the object bound by a non-concave edge or a receding feature of the computer representation of the object bound by a non-convex edge, wherein the computer representation of the object comprises a polygonal mesh comprising a first plurality of faces, a second plurality of edges, and a third plurality of vertices, wherein the protruding feature comprises a positive feature of the polygonal mesh, and wherein the receding feature comprises a negative feature of the polygonal mesh, and wherein the operations further comprise:

determining whether to identify the positive feature of the polygonal mesh or the negative feature of the polygonal mesh; and identifying, by the processing device, a set of bounding edges for the positive feature of the polygonal mesh or for the negative feature of the polygonal mesh, wherein the set of bounding edges comprises one or more of a convex edge or a planar edge when identifying the positive feature of the polygonal mesh and wherein the set of bounding edges comprises one or more of a concave edge or the planar edge when identifying the negative feature of the polygonal mesh.

19. The non-transitory computer readable storage medium of claim 18, wherein identifying the set of bounding edges comprises:

classifying each edge in the second plurality of edges as convex, planar, or concave;

classifying each vertex in the third plurality of vertices as one or more of non-hyperbolic, convex hyperbolic, or concave hyperbolic; and classifying each edge in the second plurality of edges as a simple edge or a complex edge.

20. The non-transitory computer readable storage medium of claim 19, wherein identifying the set of bounding edges further comprises:

adding a set of concave edges to the set of bounding edges when identifying the positive feature of the polygonal mesh; and adding a set of convex edges to the set of bounding edges when identifying the negative feature of the polygonal mesh.

21. The non-transitory computer readable storage medium of claim 20, wherein identifying the set of bounding edges further comprises:

classifying a first set of complex edges with two convex hyperbolic vertices as potentially bounding when identifying the positive feature of the polygonal mesh; and classifying a second set of complex edges with two concave hyperbolic vertices as potentially bounding when identifying the negative feature of the polygonal mesh.

22. The non-transitory computer readable storage medium of claim 21, wherein identifying the set of bounding edges further comprises:

reclassifying a first subset of complex edges that bound one or more negative incident features at a vertex as non-bounding;

reclassifying a second subset of complex edges that bound one or more positive incident features at a vertex as non-bounding; and reclassifying a set of complex planar edges that are internal to the one or more negative incident features or that are internal to the one or more positive incident features as non-bounding.

23. The non-transitory computer readable storage medium of claim 22, wherein identifying the set of bounding edges further comprises:

analyzing each complex edge that is classified as potentially bounding to determine whether the complex edge is dominated by another complex edge that is classified as potentially bounding, wherein a first complex edge dominates a second complex edge when a first vertex shared between the first complex edge and the second complex edge is within a Voronoi region of a second vertex of the first complex edge;

reclassifying a set of complex edges that are dominated by other complex edges as non-bounding; and adding any remaining complex edges classified as potentially bounding to the set of bounding edges.

24. The non-transitory computer readable storage medium of claim 18, having further instructions that, when executed by the processing device, cause the processing device to further perform operations comprising:
    generating a simplified computer representation of the object by removing the identified protruding feature; and
    storing the simplified computer representation for rendering the simplified computer representation of the object on a display.

\* \* \* \* \*